United States Patent
Kotrba et al.

(10) Patent No.: US 8,516,802 B2
(45) Date of Patent: Aug. 27, 2013

(54) HIGH VOLUME EXHAUST GAS TREATMENT SYSTEM

(75) Inventors: Adam J. Kotrba, Laingsburg, MI (US); Jeremy Popovich, Brooklyn, MI (US); Guanyu Zheng, Farmington, MI (US); Timothy Gardner, Canton, MI (US); Argun Yetkin, Ann Arbor, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 383 days.

(21) Appl. No.: 12/915,106

(22) Filed: Oct. 29, 2010

(65) Prior Publication Data

US 2012/0102931 A1    May 3, 2012

(51) Int. Cl.
*F01N 3/00* (2006.01)

(52) U.S. Cl.
USPC ............ 60/292; 60/286; 60/295; 60/303; 60/324

(58) Field of Classification Search
USPC ............ 60/286, 292, 295, 300, 303, 324
See application file for complete search history.

(56) References Cited

U.S. PATENT DOCUMENTS

| | | | | |
|---|---|---|---|---|
| 5,457,290 A | * | 10/1995 | Sase et al. | 181/258 |
| 5,578,277 A | * | 11/1996 | White et al. | 422/180 |
| 5,611,198 A | * | 3/1997 | Lane et al. | 60/299 |
| 5,758,491 A | | 6/1998 | Agustin et al. | |
| 6,367,245 B1 | * | 4/2002 | Yasui et al. | 60/277 |
| 6,622,482 B2 | * | 9/2003 | Knight et al. | 60/299 |
| 6,820,417 B2 | * | 11/2004 | May et al. | 60/297 |
| 6,828,156 B2 | * | 12/2004 | Ohsuga et al. | 436/135 |
| 7,434,570 B2 | | 10/2008 | Hill | |
| 8,261,542 B2 | * | 9/2012 | Yager | 60/320 |
| 2008/0223025 A1 | | 9/2008 | Hill | |
| 2008/0245063 A1 | | 10/2008 | Hill | |

FOREIGN PATENT DOCUMENTS

| | | |
|---|---|---|
| JP | 2005-233046 | 9/2005 |
| JP | 2010-216269 | 9/2010 |

* cited by examiner

*Primary Examiner* — Binh Q Tran
(74) *Attorney, Agent, or Firm* — Harness, Dickey & Pierce, P.L.C.

(57) ABSTRACT

An exhaust system for an engine having a plurality of combustion chambers includes a housing containing a first array of parallel positioned emission treatment devices and a second array of parallel positioned emission treatment devices axially spaced apart from one another. A first exhaust passageway is in fluid communication with the combustion chambers and contains the first array of emission treatment devices. A second and separate exhaust passageway is in fluid communication with the combustion chambers and contains the second array of emission treatment devices. A first valve restricts the exhaust flow through the first exhaust passageway. A second valve restricts the exhaust flow through the second exhaust passageway.

19 Claims, 3 Drawing Sheets

HIGH VOLUME EXHAUST GAS TREATMENT SYSTEM

FIELD

The present disclosure generally relates to a system for treating exhaust gases. More particularly, a gas treatment system including multiple exhaust passages, valves and burners is provided to reduce emissions in high volume applications.

BACKGROUND

To reduce the quantity of $NO_X$ and particulate matter emitted to the atmosphere during internal combustion engine operation, a number of exhaust aftertreatment devices have been developed. A need for exhaust aftertreatment systems particularly arises when diesel combustion processes are implemented. Typical aftertreatment systems for diesel engine exhaust may include one or more of a diesel particulate filter (DPF), a selective catalytic reduction (SCR) system, a hydrocarbon (HC) injector, and a diesel oxidation catalyst (DOC).

During engine operation, the DPF traps soot emitted by the engine and reduces the emission of particulate matter (PM). Over time, the DPF becomes loaded and begins to clog. Periodically, regeneration or oxidation of the trapped soot in the DPF may be required for proper operation. To regenerate the DPF, relatively high exhaust temperatures in combination with an ample amount of oxygen in the exhaust stream are needed to oxidize the soot trapped in the filter.

The DOC is typically used to generate heat useful for regenerating the soot loaded DPF. When hydrocarbons (HC) are sprayed over the DOC at or above a specific light-off temperature, the HC will oxidize. This reaction is highly exothermic and the exhaust gases are heated during light-off. The heated exhaust gases are used to regenerate the DPF.

Under many engine operating conditions, however, the exhaust gas is not hot enough to achieve a DOC light-off temperature of approximately 300° C. As such, DPF regeneration does not passively occur. Furthermore, $NO_X$ adsorbers and selective catalytic reduction systems typically require a minimum exhaust temperature to properly operate.

A burner may be provided to heat the exhaust stream upstream of the various aftertreatment devices. Known burners have successfully increased the exhaust temperature of relatively small displacement internal combustion engines for automotive use. However, other applications including diesel locomotives, stationary power plants, marine vessels and others may be equipped with relatively large diesel compression engines. The maximum exhaust mass flow rate from the larger engines may be more than ten times the maximum flow rate typically provided to the burner. While it may be possible to increase the size of the burner to account for the increased exhaust mass flow rate, the cost, weight and packaging concerns associated with this solution may be unacceptable.

Furthermore, it is oftentimes desirable to operate the large displacement engines at relatively low output levels. The minimum exhaust mass flow rate may be twenty times less than the maximum mass flow rate. Therefore, a need may exist in the art for an arrangement to reduce the emissions of the exhaust output from a large diesel engine during all phases of operation while minimally affecting the cost, weight, size and performance of the exhaust system.

SUMMARY

This section provides a general summary of the disclosure, and is not a comprehensive disclosure of its full scope or all of its features.

An exhaust system for an engine having a plurality of combustion chambers includes a housing containing a first array of parallel positioned emission treatment devices and a second array of parallel positioned emission treatment devices axially spaced apart from one another. A first exhaust passageway is in fluid communication with the combustion chambers and contains the first array of emission treatment devices. A second and separate exhaust passageway is in fluid communication with the combustion chambers and contains the second array of emission treatment devices. A first valve restricts the exhaust flow through the first exhaust passageway. A second valve restricts the exhaust flow through the second exhaust passageway.

An exhaust system for an engine having a plurality of combustion chambers includes a manifold adapted to receive exhaust from the combustion chambers. A first array of emission treatment devices includes each device positioned in parallel with one another. A first exhaust passageway includes an upstream end in fluid communication with the manifold and a downstream end in communication with the first array of emission treatment devices. A first valve restricts the exhaust flow through the first exhaust passageway. A second and separate exhaust passageway includes an upstream end in fluid communication with the manifold and contains a burner to selectively heat the exhaust flowing therethrough. A downstream end of the second exhaust passageway supplies exhaust to the first array of emission treatment devices.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
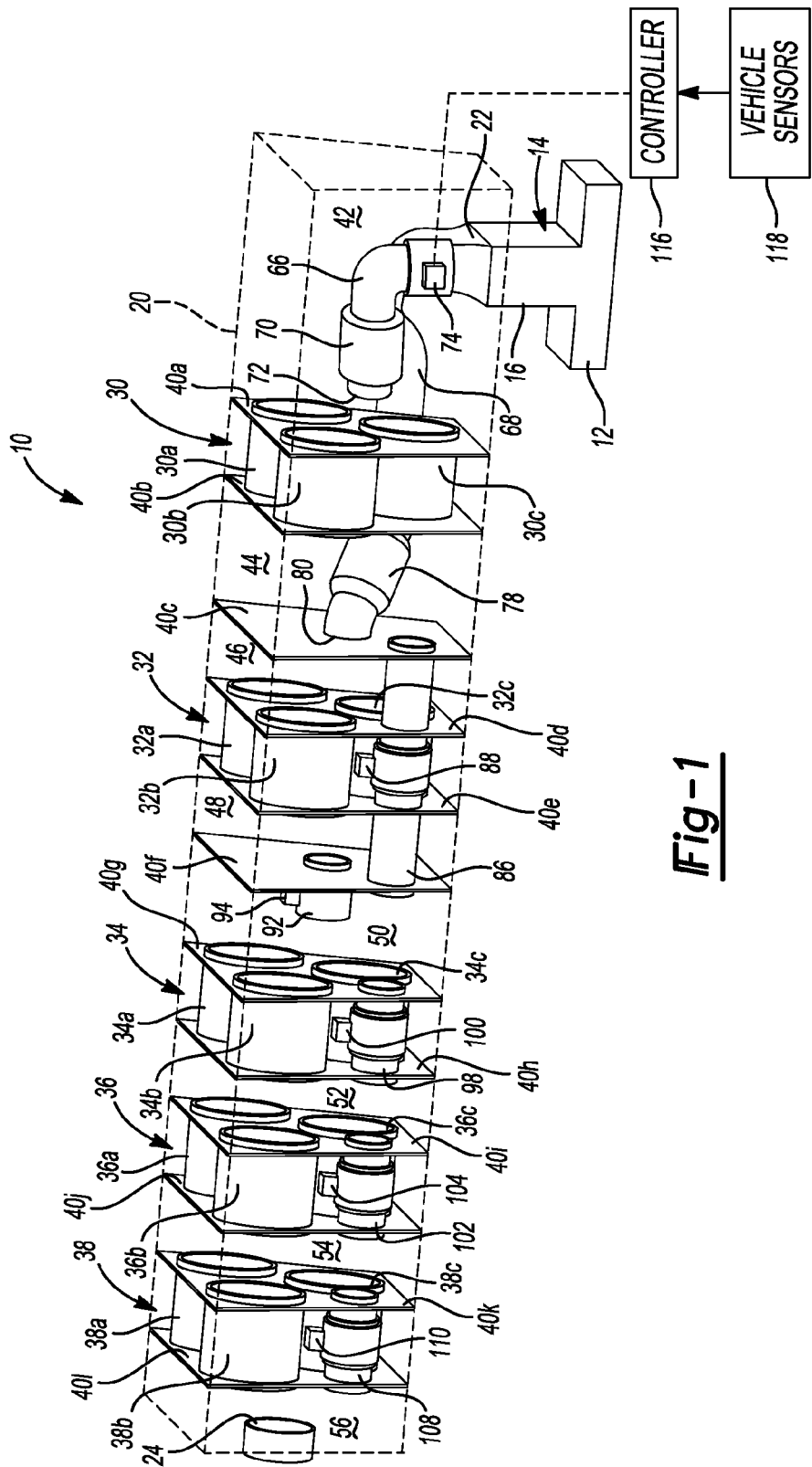
FIG. 1 is a perspective view of an exhaust system for an internal combustion engine.

FIG. 1 depicts a diesel exhaust gas aftertreatment system 10 associated with an exemplary locomotive engine 12. A turbocharger 14 may be associated with engine 12 and includes a manifold 16 positioned in an exhaust stream of engine 12. Aftertreatment system 10 is positioned in fluid communication with and downstream from the combustion chambers of engine 12.

Aftertreatment system 10 includes a housing 20 coupled to manifold 16. Housing 20 includes an inlet 22 in communication with one or more of the combustion cylinders of engine 12 via manifold 16. Housing 20 includes an outlet 24 in communication with the atmosphere. Housing 20 contains a plurality of exhaust treatment devices (ETDs) arranged in arrays 30, 32, 34, 36 and 38. It will be appreciated that the ETDs may include any suitable device operable for decreasing undesirable matter in the exhaust before the exhaust flows to the outside atmosphere. In FIG. 1, each of the ETDs includes one of a diesel particulate filter (hereinafter "DPF") or a diesel oxidation catalyst (DOC). DPFs of arrays 30 and 32 collect soot as the exhaust flows therethrough. Arrays 34, 36 and 38 include DOCS. Other ETDs may include a selective catalytic reduction device (SCR device), or the like. For example, ETD arrays 34, 36 and 38 may include SCR devices in lieu of DOCS.

Each ETD array is constructed in a substantially similar manner. Accordingly, only array 30 will be described in detail. Array 30 includes DPFs 30a, 30b and 30c positioned in parallel with one another such that an upstream end of each DPF protrudes through an aperture formed in a first header 40a. An upstream side of first header 40a and housing 20 define a first cavity 42. Header 40a engages the walls of housing 20 to assure that gas within first cavity 42 flows through one of ETDs 30a, 30b or 30c. A second header 40b supports the opposite end of each of ETDs 30a, 30b and 30c. A downstream end of each of the ETDs of array 30 protrudes through an aperture in second header 40b. The downstream side of second header 40b and the upstream side of a third header 40c define a second cavity 44. In similar fashion, array 32 includes ETDs 32a, 32b and 32c positioned in parallel with one another and being mounted and protruding through a fourth header 40d and a fifth header 40e. A third cavity 46 is defined by third header 40c and fourth header 40d. A fourth cavity 48 is defined as the volume between fifth header 40e and a sixth header 40f.

Array 34 includes ETDs 34a, 34b and 34c positioned in parallel with one another, fixed to and protruding through a seventh header 40g and an eighth header 40h. A fifth cavity 50 is defined as the volume between sixth header 40f and seventh header 40g.

Array 36 includes ETDs 36a, 36b and 36c positioned in parallel with one another and fixed to ninth and tenth headers 40i and 40j, respectively. A sixth cavity 52 is positioned between headers 40h and 40i.

Figure 2:
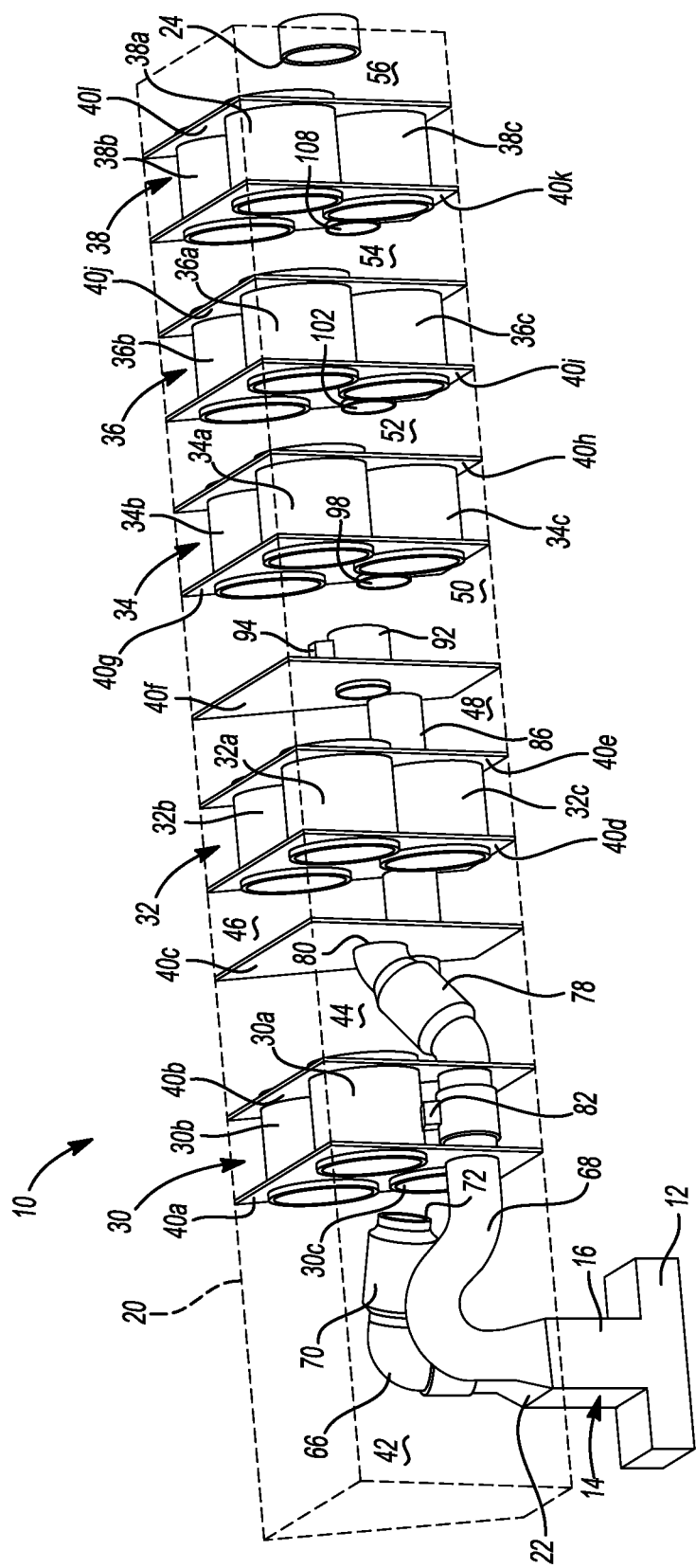
FIG. 2 is another perspective view of the exhaust system depicted in FIG. 1.

Array 38 includes ETDs 38a, 38b and 38c positioned in parallel with one another, fixed to and protruding through eleventh and twelfth headers 40k and 40l, respectively. A seventh cavity 54 is provided between tenth header 40j and eleventh header 40k. An eighth cavity 56 is formed between twelfth header 40l and housing 20. The quantity of ETDs per array and the number of arrays depicted in FIGS. 1 and 2 is merely exemplary. Other aftertreatment systems having other arrangements are contemplated.

Aftertreatment system 10 includes a first passageway 66 and a second passageway 68 each extending downstream from and in fluid communication with inlet 22. First passageway 66 provides exhaust to an upstream end of a first burner 70. A downstream end of burner 70 defines an outlet 72 of first passageway 66. Outlet 72 is in communication with first cavity 42. A first valve 74 is positioned within first passageway 66 and is operable to vary the flow of exhaust therethrough. First valve 74 may function to fully open, completely close or variably restrict flow through first passageway 66.

Second passageway 68 extends parallel to first passageway 66. Second passageway 68 passes through first cavity 42, array 30 and third header 40c to provide exhaust to third cavity 46. The exhaust flowing through second passageway 68 bypasses the ETDs of array 30. A second burner 78 is positioned within second passageway 68 and includes an upstream end in receipt of exhaust from inlet 22 and a downstream end in communication with an outlet 80 of second passageway 68. A second valve 82 is positioned upstream of second burner 78 and is operable to vary the flow through second passageway 68 in similar fashion to first valve 74. A tube 86 connects second cavity 44 and fifth cavity 50. Tube 86 passes through third header 40c, fourth header 40d, fifth header 40e and sixth header 40f. A third valve 88 selectively varies the flow through tube 86. Another tube 92 extends through sixth header 40f to place fourth cavity 48 in communication with fifth cavity 50. A fourth valve 94 selectively restricts flow through tube 92. Based on the arrangement described thus far, a portion of the exhaust provided from engine 12 passes through first passageway 66, array 30 and tube 86 to fifth cavity 50. A different portion of the exhaust flow from engine 12 flows through second passageway 68, array 32 and tube 92 to fifth cavity 50.

A tube 98 extends through seventh header 40g and eighth header 40h to connect fifth cavity 50 and sixth cavity 52 with one another. A fifth valve 100 selectively restricts flow through tube 98.

Another tube 102 places sixth cavity 52 in fluid communication with seventh cavity 54. A sixth valve 104 selectively restricts flow through tube 102. Another tube 108 extends through array 38 and connects seventh cavity 54 to eighth cavity 56. A seventh valve 110 is operable to restrict flow through tube 108.

In operation, exhaust aftertreatment system 10 provides flexibility to account for a wide variance in exhaust mass flow rates entering inlet 22. If a minimal to moderate flow is provided, one of first valve 74 and second valve 82 may be closed to drive the exhaust flow through one of first passageway 66 and second passageway 68. For example, first valve 74 may be closed to force all of the exhaust flow from engine 12 through second passageway 68. No exhaust passes through the ETDs of array 30 at this time. All of the exhaust travelling through second passageway 68 passes through one of ETDs 32a, 32b and 32c. For a minimal flow condition, valve 100 may be closed to drive the exhaust through the ETDs of array 34. Valves 104 and 110 may be positioned in the open or closed position without significant effect on the overall exhaust gas flow rate. To achieve active regeneration of DPFs 32a, 32b and 32c, it may be desirable to operate burner 78 by injecting a fuel into the exhaust and igniting the fuel. If the heat content of the exhaust passing through second passageway 68 is sufficient, burner 78 need not be operated.

Exhaust aftertreatment system 10 is also operable to selectively regenerate individual ETD arrays 34, 36 and 38 as the need arises. Valves 100, 104 and 110 may be selectively opened or closed to cause the exhaust gas to flow through only one of arrays 34, 36 and 38 at one time. Alternatively, the valves may be operated to cause flow through any two or all three of arrays 34, 36 and 38.

As the exhaust flow rate provided by engine 12 increases, first valve 74 and second valve 82 may be controlled to allow exhaust gas to pass through each of first passageway 66 and second passageway 68 to share the volume of gas treated by array 30 and array 32. Valves 88 and 92 effectively determine the flow rate allowed through each of arrays 30 and 32, respectively. In similar fashion, valves 100, 104, 110 may be controlled to balance the exhaust flow through each of arrays 34, 36, 38, if desired.

One or more of valves 74, 82, 88, 94, 98, 104 and 110 may be passive or actively controlled valves. The passive valves may be normally closed valves including a biased flap that is rotated toward an open position as the pressure acting on the flap increases. Examples of suitable passive valves are disclosed within U.S. Pat. No. 7,434,570 and U.S. Patent Application Publication Nos. 2008/0245063 and 2008/0223025, each of which is herein incorporated by reference. Alternatively, any one or more of the valves may be actively controlled. It is contemplated that the actively controlled valves are in receipt of a signal from a controller 116. Controller 116 receives data from any number of sources including a plurality of vehicle sensors 118. Vehicle sensors 118 may provide signals indicative of exhaust gas temperature, exhaust gas mass flow rate, vehicle speed, $NO_X$ content, oxygen content and any number of other possibly relevant operating parameters.

Figure 3:
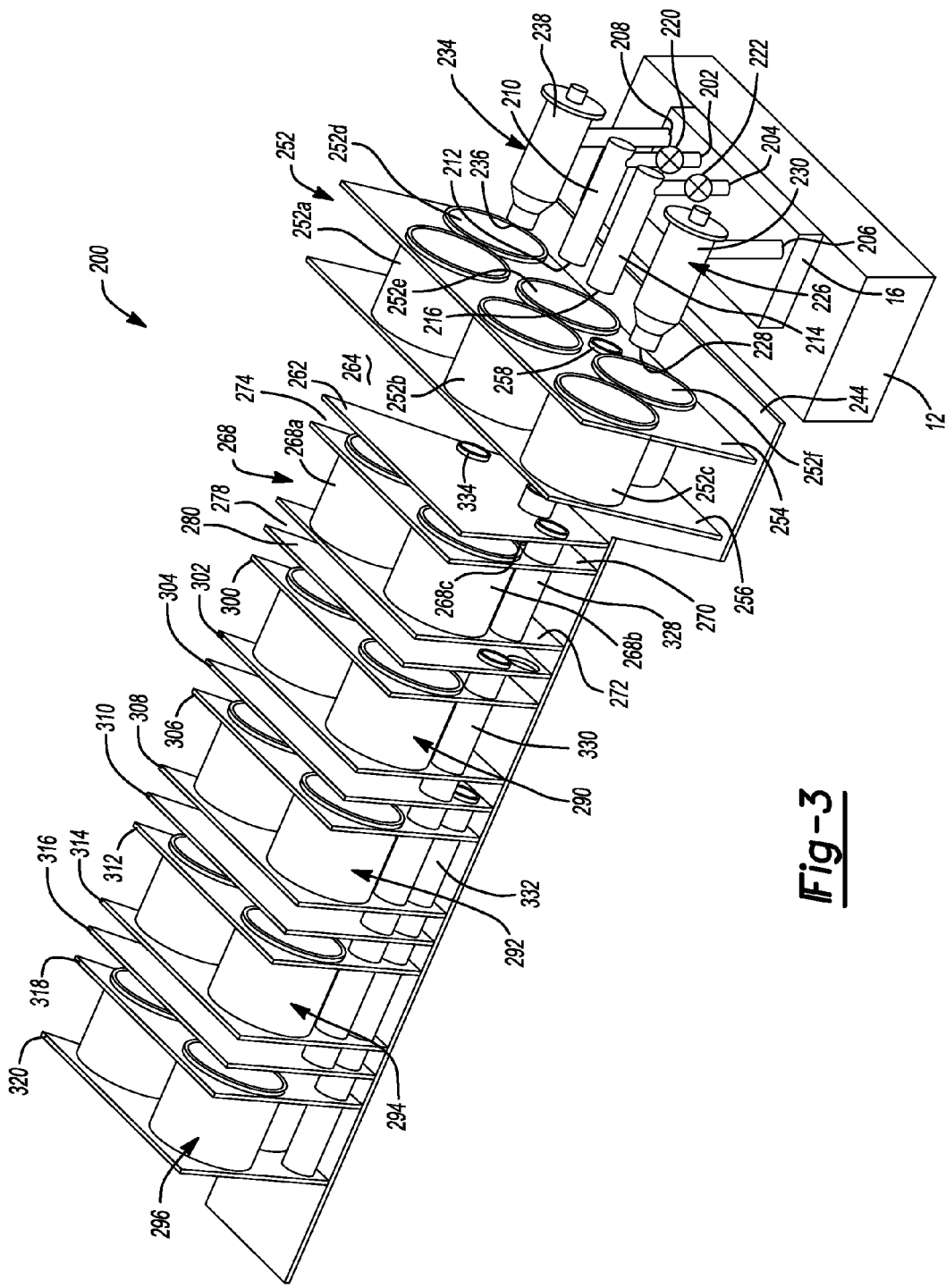
FIG. 3 is a perspective view of another exhaust system constructed in accordance with the teachings of the present disclosure.

FIG. 3 depicts another exhaust aftertreatment system identified at reference numeral 200. Exhaust aftertreatment system 200 is designed to receive internal combustion engine exhaust from engine 12. Turbocharger 14 and manifold 16 may be present or absent in either system 10 or system 200 depending on the particular vehicle configuration. Aftertreatment system 200 includes inlets 202, 204, 206 and 208 in receipt of exhaust provided from the combustion chambers of engine 12. Inlet 202 is associated with a first passage 210 having an outlet 212. Inlet 204 is associated with a second passage 214 having an outlet 216. Second passage 214 extends in parallel to first passage 210. A first valve 220 is operable to selectively restrict exhaust flow through first passage 210. Similarly, a second valve 222 is operable to selectively restrict the flow of exhaust gas through second passage 214.

A third passage 226 extends in parallel to first and second passages 210, 214 and includes inlet 206 and an outlet 228. A burner 230 is positioned in series within third passage 226. Burner 230 may be selectively provided with fuel, air and an energy source for igniting the fuel. A fourth passage 234 extends in parallel to third passage 226 and includes inlet 208 and an outlet 236. A burner 238 is positioned in series within fourth passage 234 and includes provisions for a supply of fuel, air and fuel ignition. Each of outlets 212, 216, 228 and 236 are in communication with a first volume 244.

A first exhaust treatment device array 252 is in communication with first volume 244 and includes DPFs 252a through 252f, a first header 254 and second header 256. A first bypass tube 258 extends through first array 252 and a third header 262. A second volume 264 is defined as the volume between second header 256 and third header 262. A second array of DPFs 268 includes DPFs 268a, 268b and 268c supported and extending through a fourth header 270 and a fifth header 272. First tube 258 interconnects first volume 244 and a third volume 274 extending between third header 262 and fourth header 270. The upstream ends of DPFs 268a, 268b and 268c are in communication with volume 274.

During engine operation, some of the exhaust positioned within first volume 244 is allowed to bypass the ETDs of array 252 and pass through ETD array 268. The output from first array 252 and second array 268 is supplied to a fourth volume 278 positioned between fourth header and a fifth header 280. Once the exhaust passes through one of arrays 252 and 268, the exhaust at volume 278 is divided along four parallel paths such that the exhaust passes through one of arrays 290, 292, 294 and 296. The combination of various headers 300, 302, 304, 306, 308, 310, 312, 314, 316, 318, 320 and bypass tubes 328, 330, 332, 334 defines the four parallel exhaust paths.

During engine operation, exhaust aftertreatment system 200 is operable to account for a wide range of exhaust flow rates. At relatively low flow rates, one or more of first and second valves 220, 222 may be partially or fully closed to force the exhaust to flow through second passage 214 and fourth passage 234. As required, burner 230 and burner 238 may be operated to heat the exhaust gas flowing therethrough. During higher volume flow rates of engine operation, first valve 220 and second valve 222 may be opened to allow exhaust gas to flow through first passage 210 and third passage 226 in addition to flowing through second passage 214 and fourth passage 234. Valves 220, 222 may be passive or actively controlled valves.

Furthermore, it should be noted that burners 230, 238 are positioned laterally outboard from first passage 210 and third passage 226. Each of the outlets 212, 216, 228 and 236 are positioned laterally inboard from outer edges of the ETDs of first array 252. This arrangement of components allows the use of only two burners for a relatively high exhaust flow rate. FIG. 3 also illustrates that the number of emission treatment devices within first array 252 is greater than the number of passage outlets positioned upstream of the first array. Also, the number of ETDs within first array 252 is greater than the number of ETDs within second array 268. This configuration maximizes the number of ETDs proximate burners 230, 238.

It should be appreciated that exhaust aftertreatment systems 10 and 200 are configured to be compactly packaged within an elongated parallelepiped shaped volume. Such packaging may be beneficial for use in a vehicle having a large elongated internal combustion engine such as a locomotive. Based on these space constraints, closely packaged emission treatment devices define arrays that may be axially spaced apart from one another and positioned in fluid communication in either series or parallel as required to properly treat the exhaust. The exhaust systems of the present disclosure provide the desired flexibility for treating exhaust at a wide range of flow rates while meeting target weight and packaging constraints. It is contemplated that additional emission treatment devices may be added to or removed from the exemplary aftertreatment systems discussed. In one arrangement, arrays of SCRs may be added downstream from arrays of DOCS or other emission treatment devices.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An exhaust system for an engine having a plurality of combustion chambers, comprising:
   a housing;
   a first array of parallel positioned emission treatment devices;
   a second array of parallel positioned emission treatment devices, the first and second arrays being spaced apart within the housing;
   a first exhaust passageway in fluid communication with the combustion chambers and containing the first array of emission treatment devices;
   a second and separate exhaust passageway in fluid communication with the combustion chambers and containing the second array of emission treatment devices;
   a first valve for restricting the exhaust flow through the first exhaust passageway; and
   a second valve for restricting the exhaust flow through the second exhaust passageway.

2. The exhaust system of claim 1 wherein the first exhaust passageway includes a portion bypassing the second array of emission treatment devices and wherein the second passageway includes a portion bypassing the first array of emission treatment devices.

3. The exhaust system of claim 2 further including a first burner positioned within the first passageway downstream of the first valve and upstream of the first array of emission treatment devices.

4. The exhaust system of claim 3 further including a second burner positioned within the second passageway downstream of the second valve and upstream of the second array of emission treatment devices.

5. The exhaust system of claim 2 wherein the first and second arrays are coaxially aligned with one another and the bypassing portion of the first passageway extends within the housing and parallel to the second array.

6. The exhaust system of claim 5 wherein the bypassing portion of the second passageway extends parallel to the first array.

7. The exhaust system of claim 6 wherein an upstream end of the bypassing portion of the first passageway is positioned downstream of the first array.

8. The exhaust system of claim 7 wherein a downstream end of the bypassing portion of the second passageway is positioned upstream of the second array.

9. The exhaust system of claim 1 further including a third array of parallel emission treatment devices positioned downstream and axially spaced apart from the first and second arrays, an upstream end of the third array being in receipt of exhaust passing through both of the first and second arrays.

10. The exhaust system of claim 9 further including a third passageway bypassing the third array and a third valve for restricting flow through the third passageway.

11. The exhaust system of claim 1 wherein the first array of emission treatment devices includes a greater number of emission treatment devices than the second array.

12. An exhaust system for an engine having a plurality of combustion chambers, comprising:
a manifold adapted to receive exhaust from the combustion chambers;
a first array of emission treatment devices, each device being positioned in parallel with one another;
a first exhaust passageway having an upstream end in fluid communication with the manifold and a downstream end in communication with the first array of emission treatment devices;
a first valve for restricting the exhaust flow through the first exhaust passageway;
a second and separate exhaust passageway having an upstream end in fluid communication with the manifold and containing a burner to selectively heat the exhaust flowing therethrough, a downstream end of the second exhaust passageway supplying exhaust to the first array of emission treatment devices; and
a third and separate exhaust passageway having an upstream end in fluid communication with the manifold and a downstream end in communication with the first array of emission treatment devices, the third passageway containing a second valve for selectively restricting exhaust flow therethrough.

13. The exhaust system of claim 12 further including a fourth exhaust passageway having an upstream end in fluid communication with the manifold and a downstream end in communication with the first array of emission treatment devices, the fourth exhaust passageway including a burner to selectively heat the exhaust flowing therethrough.

14. The exhaust system of claim 13 wherein each of the first, second, third and fourth passageways extend substantially parallel to one another.

15. The exhaust system of claim 14 wherein the first and third passageways are positioned laterally inboard of the second and fourth passageways.

16. The exhaust system of claim 15 wherein the first array of emission treatment devices includes more than four emission treatment devices positioned in parallel with one another.

17. An exhaust system for an engine having a plurality of combustion chambers, comprising:
a manifold adapted to receive exhaust from the combustion chambers;
a first array of emission treatment devices, each device being positioned in parallel with one another;
a first exhaust passageway having an upstream end in fluid communication with the manifold and a downstream end in communication with the first array of emission treatment devices;
a first valve for restricting the exhaust flow through the first exhaust passageway;
a second and separate exhaust passageway having an upstream end in fluid communication with the manifold and containing a burner to selectively heat the exhaust flowing therethrough, a downstream end of the second exhaust passageway supplying exhaust to the first array of emission treatment devices; and
a second array of emission treatment devices, each device being positioned parallel with one another, the second array of emission treatment devices being spaced apart from and positioned axially downstream from the first array of emission treatment devices.

18. The exhaust system of claim 17 further including a bypass passage having an upstream end positioned in parallel with an upstream end of the first array of emission treatment devices, a downstream end of the bypass passage supplying exhaust to an upstream end of the second array of emission treatment devices.

19. The exhaust system of claim 18 wherein the exhaust flowing through the first and second arrays is combined to supply third and fourth arrays of emission treatment devices, the third and fourth arrays being axially spaced apart from one another and plumbed in parallel with each other.

* * * * *